(12) United States Patent
Kim et al.

(10) Patent No.: US 6,885,420 B2
(45) Date of Patent: Apr. 26, 2005

(54) ARRAY PANEL FOR A TRANSFLECTIVE LIQUID CRYSTAL DISPLAY DEVICE

(75) Inventors: Dong-Guk Kim, Seoul (KR); Kyoung-Su Ha, Seoul (KR); Heung-Lyul Cho, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/815,712

(22) Filed: Apr. 2, 2004

(65) Prior Publication Data

US 2005/0001960 A1 Jan. 6, 2005

Related U.S. Application Data

(62) Division of application No. 10/175,426, filed on Jun. 20, 2002, now Pat. No. 6,734,935.

(30) Foreign Application Priority Data

Jul. 4, 2001 (KR) .................................. 2001-39638

(51) Int. Cl.[7] ........................ G02F 1/136; G02F 1/1335
(52) U.S. Cl. ........................ 349/114; 349/43; 349/113; 257/59; 257/72; 345/92
(58) Field of Search ........................ 349/43, 113, 114; 257/59, 72; 345/92

(56) References Cited

U.S. PATENT DOCUMENTS

| 6,452,654 B2 | 9/2002 | Kubo et al. |
| 6,490,019 B2 | 12/2002 | Lee et al. |
| 6,512,560 B2 | 1/2003 | Ohtake et al. |
| 6,654,076 B2 * | 11/2003 | Ha et al. ............ 349/43 |
| 2002/0054269 A1 * | 5/2002 | Maeda et al. ........ 349/181 |
| 2003/0016322 A1 * | 1/2003 | Ha et al. ............ 349/113 |

* cited by examiner

Primary Examiner—Huyen Ngo
(74) Attorney, Agent, or Firm—McKenna Long & Aldridge LLP (57) ABSTRACT

An array panel for a transflective liquid crystal display device includes a substrate; a thin film transistor on the substrate; a first passivation layer covering the thin film transistor and having a first transmissive hole and an inclined portion surrounding the first transmissive hole; a transparent electrode on the first passivation layer, the transparent electrode contacting the thin film transistor; and a reflector over the transparent electrode, the reflector completely covering the inclined portion and having a second transmissive hole corresponding to the first transmissive hole.

10 Claims, 5 Drawing Sheets

ARRAY PANEL FOR A TRANSFLECTIVE LIQUID CRYSTAL DISPLAY DEVICE

This application is a divisional application of U.S. patent application Ser. No.: 10/175,426 filed Jun. 20, 2002, now U.S. Pat. No. 6,734,935; which claims priority to Korean Patent Application No.: 2001-39638, filed Jul. 4, 2001, each of which is hereby incorporated by reference for all purposes as if fully set forth herein.

BACKGROUND OF THE INVENTION

1. Field of the Invention

The present invention relates to a liquid crystal display (LCD) device and more particularly, to an array panel for a transflective liquid crystal display device.

2. Discussion of the Related Art

In general, the LCD device includes two substrates, which are spaced apart and facing each other, and a liquid crystal layer interposed between the two substrates. Each of the substrates includes an electrode and the electrodes of each substrate are facing each other, also. Voltage is applied to each electrode and an electric field is induced between the electrodes. An alignment of the liquid crystal molecule is changed by the intensity of the electric field, and the LCD device displays a picture by transmissivity of the light varying according to the arrangement of the liquid crystal molecules.

Because the liquid crystal display device is not luminescent, it needs an additional light source in order to display images, and the liquid crystal display device is categorized into a transmissive type and a reflective type depending on the kind of light source.

In the transmissive type, a back light behind a liquid crystal panel is used as a light source. Light incident from the back light penetrates the liquid crystal panel, and the amount of the transmitted light is controlled according to the alignment of the liquid crystal molecules. Here, the substrates must be transparent and the electrode of each substrate must also be formed of transparent conductive material. As the transmissive liquid crystal display device uses the back light as a light source, it can display a bright image in dark surroundings. By the way, because an amount of the transmitted light is very small for the light incident from the back light, the brightness of the back light should be increased in order to increase the brightness of the LCD device. Consequently, the transmissive liquid crystal display device has high power consumption due to the back light.

On the other hand, in the reflective type LCD device, sunlight or artificial light is used as a light source of the LCD device. The light incident from the outside is reflected at a reflective plate of the LCD device according to the arrangement of the liquid crystal molecules. Since there is no back light, the reflective type LCD device has much lower power consumption than the transmissive type LCD device. However, the reflective type LCD device cannot be used in dark places because it depends on an external light source.

Therefore, a transflective LCD device, which can be used both in a transmissive mode and in a reflective mode, has been recently proposed. A conventional transflective LCD device will be described hereinafter more in detail.

Figure 1:
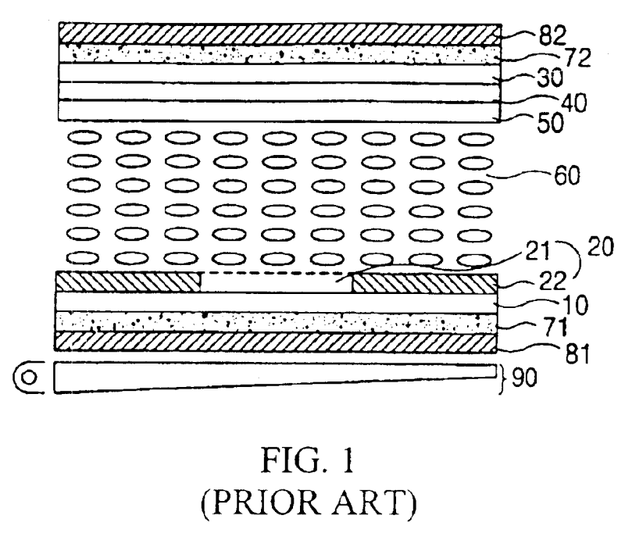
FIG. 1 is a cross-sectional view of a conventional transflective liquid crystal display device.

FIG. 1 is a cross-sectional view of a conventional transflective LCD device. In FIG. 1, the conventional transflective LCD device has a lower substrate 10 and an upper substrate 30, and the substrates 10 and 30 are spaced apart from and facing each other.

A pixel electrode 20 is formed on the inner surface of the lower substrate 10 and connected to the thin film transistor (not shown) formed on the inner surface of the lower substrate 10. The pixel electrode 20 includes a transmissive electrode 21 and a reflective electrode 22. The reflective electrode 22 has a hole in which the transmissive electrode 21 is located. The transmissive electrode 21 is formed of a transparent conductive material such as indium-tin-oxide (ITO) or indium-zinc-oxide (IZO), which has high transmittance. The reflective electrode 22 is formed of an opaque conductive material such as aluminum (Al), which has high reflectance and low resistivity.

Next, a color filter 40, which corresponds to the pixel electrode 20, is formed on the inner surface of the upper substrate 30 and a common electrode 50 is formed on the color filter 40. The common electrode 50 is also made of the transparent conductive material.

A liquid crystal layer 60 is disposed between the lower and upper substrates 10 and 30, and molecules of the liquid crystal layer 60 are arranged horizontally with respect to the substrates 10 and 30.

On the outer surfaces of the substrates 10 and 30, a first retardation film 71 and a second retardation film 72 are arranged, respectively. The first and second retardation films 71 and 72 change the polarized state of light. In case of the first and second retardation films 71 and 72 having a phase difference of $\lambda/4$ ($\lambda=550$ nm), an incident circular polarized light changes into linear polarized light, and an incident linear polarized light changes into circular polarized light.

A first polarizer 81 and a second polarizer 82 are arranged on the outer surface of the first and second retardation films 71 and 72. The second polarizer 82 is an analyzer, and the transmission axis of the second polarizer 82 has an angle of 90 degrees with the transmission axis of the first polarizer 81.

Next, a back light 90 is located under the outside of the first polarizer 81. The back light 90 is used as a light source of a tranmissive mode of the transflective LCD device.

This transflective LCD device is a normally white mode and in such case, white light is emitted when voltage is not applied. By the way, the transflective LCD device is planned on the basis of the reflective mode. Accordingly, transmittance of the transmissive mode becomes only 50% of the transmittance of the reflective mode when the voltage is not applied, and thus gray light is emitted in the transmissive mode.

Figure 2:
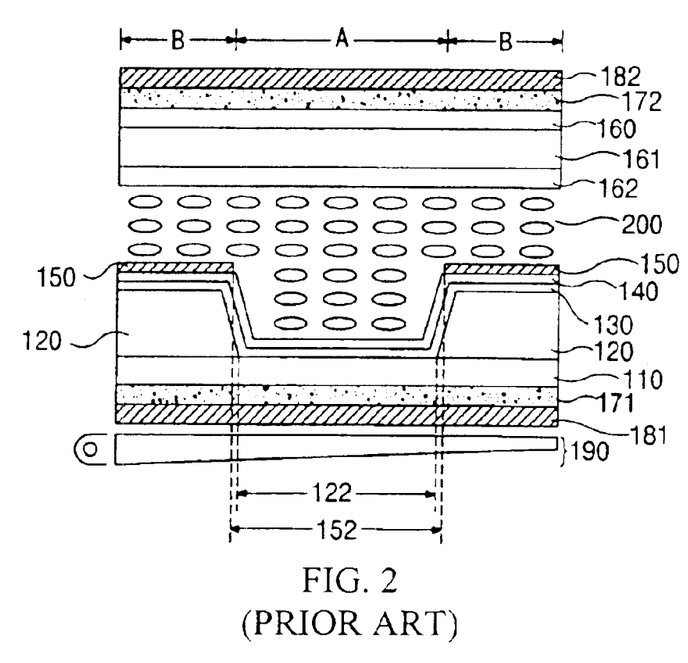
FIG. 2 is a cross-sectional view of another transflective liquid crystal display device.

FIG. 2 illustrates the transflective LCD device to solve the above problem. In FIG. 2, the transflective LCD device is divided into a transmissive region "A" and a reflective region "B".

The transflective LCD device has a lower substrate 110 and an upper substrate 160 facing apart from each other. A first passivation layer 120 is formed on the inner surface of the lower substrate 110, and the first passivation layer 120 has a first trasmissive hole 122 in the transmissive region "A". A transmissive electrode 130 of a transparent conductive material is formed on the first passivation layer 120. Next, a second passivation layer 140 is formed on the transmissive electrode 130, and a reflective electrode 150 is formed on the second passivation layer 140. The reflective electrode 150 has a second transmissive hole 152 exposing the transmissive electrode 130 on the first transmissive hole 122. On the other hand, a thin film transistor (not shown) is formed on the inner surface of the lower substrate 110, and the thin film transistor is connected electrically to not only the transmissive electrode 130 but also the reflective electrode 150.

A color filter 161 is formed on the inner surface of the upper substrate 160 and a common electrode 162 is formed on the color filter 161.

Next, retardation films 171 and 172 are arranged on the outer surface of the lower and upper substrates 110 and 160, respectively. Polarizers 181 and 182 are arranged on the outer surface of the respective retardation film 171 and 172. A back light 190 is located under the lower polarizer 181.

A liquid crystal layer 200 is disposed between the reflective electrode 150 and the common electrode 162. The liquid crystal molecules of the liquid crystal layer 200 are arranged horizontally with respect to the substrates 110 and 160. The liquid crystal layer 200 has a positive permittivity anisotropy value, so the liquid crystal molecules are arranged parallel to a direction of the electric field induced between the reflective electrode 150 and the common electrode 162 when voltage is applied to the electrodes 130, 150 and 162.

A phase difference of the liquid crystal layer depends on the refractive index anisotropy value (Δn) and the thickness (d) of the liquid crystal layer. Therefore, the phase difference of the liquid crystal layer can be controlled by changing the thickness of the liquid crystal layer.

Accordingly, as shown in FIG. 2, the first passivation layer 120 has a first transmissive hole 122 so that the brightness in the transmissive mode and the reflective mode may be made uniform. At this time, it is desirable that the liquid crystal layer 200 in the transmissive region "A" has twice thickness of the liquid crystal layer 200 in the reflective region "B".

Figure 3A:
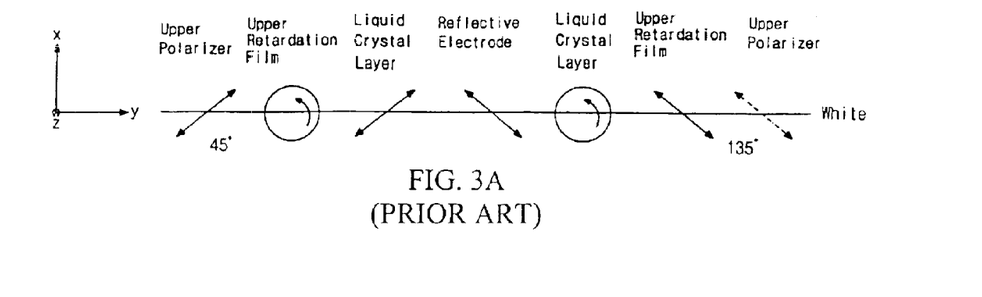
FIGS. 3A and 3B are drawings showing polarized situations before and after applying voltage in the reflective mode of FIG. 2.
Figure 3B:
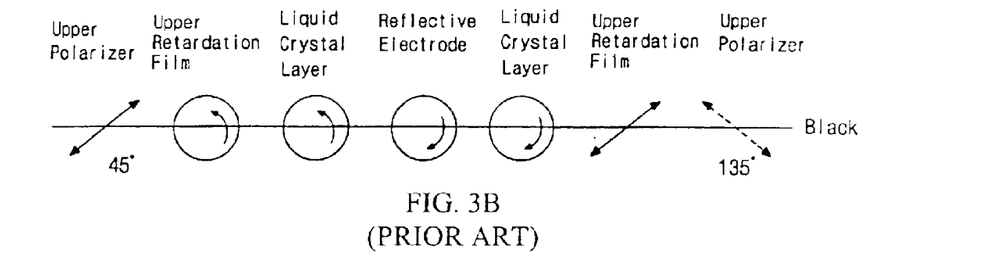
Figure 4A:
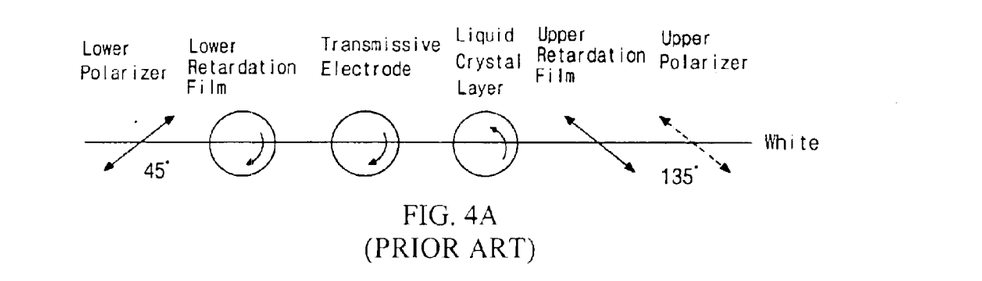
FIGS. 4A and 4B are drawings of showing polarized situations before and after applying voltage in the transmissive mode of FIG. 2.
Figure 4B:
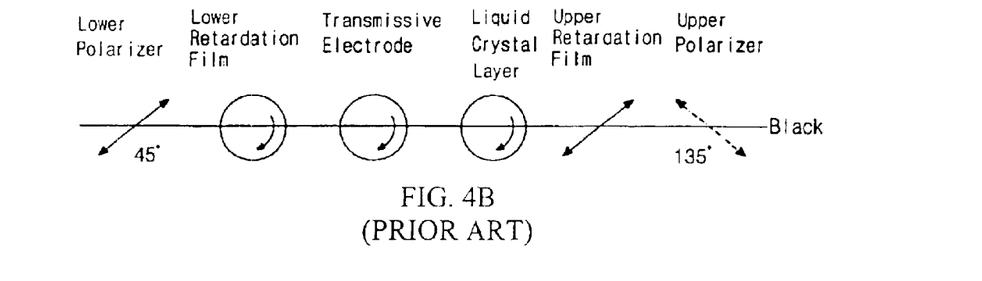

The polarized situations of the transflective LCD device of FIG. 2 are illustrated in FIGS. 3A and 3B and in FIGS. 4A and 4B.

FIGS. 3A and 3B shows the polarized states before and after applying voltage in the reflective mode, respectively. Here, the polarized situations are represented according to a progressing direction of the light. Meanwhile, y-axis is a direction parallel to the substrates 110 and 160 of FIG. 2 and z-axis is a direction perpendicular to the substrates 110 and 160. And x-axis is defined in a direction perpendicular to both the y-axis and the z-axis. Therefore, the transmission axis of the upper polarizer 182 has an angle of 135 degrees to the x-axis and the transmission axis of the lower polarizer 181 has an angle of 45 degrees to the x-axis as watched from the bottom of the liquid crystal panel. In the meantime, the transmission axis of the upper polarizer 182 has an angle of 45 degrees to the x-axis as watched from the top of the liquid crystal panel.

At this time, the liquid crystal layer 200 disposed in the reflective region "B" of FIG. 2 has a phase difference of λ/4 and is right-circulary polarized before applying voltage.

The optical axis of the lower retardation film 171 of FIG. 2 is parallel to the y-axis and the lower retardation film 171 is right-handed. Therefore, an incident light of 45 degrees is right-circularly polarized and an incident light to be right-circularly polarized is linearly polarized at an angle of 135 degrees. An incident light of 135 degrees is left-circularly polarized and an incident light to be left-circularly polarized is linearly polarized at an angle of 45 degrees.

On the other hand, the optical axis of the upper retardation film 172 of FIG. 2 is parallel to the x-axis and the upper retardation film 172 is left-handed. And thus an incident light of 45 degrees to the x-axis is left-circularly polarized and an incident light to be left-circularly polarized is linearly polarized at an angle of 135 degrees. Next, an incident light of 135 degrees to the x-axis is right-circularly polarized and an incident light to be right-circularly polarized is linearly polarized at an angle of 45 degrees.

In FIG. 3A, as voltage is not applied to the transflective LCD device, a light is linearly polarized an angle of 45 degrees to the x-axis through the upper polarizer 182 of FIG. 2, and the linearly polarized light is left-circularly polarized through the upper retardation film 172. Next, the left-circularly polarized light goes through the liquid crystal layer 200 disposed in the reflective region "B" to be linearly polarized at an angle of 45 degrees from the left-circularly polarization. This linearly polarized light is reflected at the reflective electrode 150 of FIG. 2, and so the progressing direction of the light changes. Accordingly, the reflective light has a polarizing angle of 135 degrees to the x-axis. Next, the linearly polarized light at an angle of 135 degrees is left-circularly polarized through the liquid crystal layer 200 disposed in the reflective region "B". The left-circularly polarized light is linearly polarized at an angle of 135 degrees again through the upper retardation film 172. As the linearly polarized light has a polarizing direction to coincide with the transmission axis of the upper polarizer 182, the linearly polarized light is all transmitted. Therefore, the displayed picture becomes white.

Next, in FIG. 3B, when voltage is applied to the transflective LCD device, a light is linearly polarized at an angle of 45 degrees to the x-axis through the upper polarizer 182 of FIG. 2, and the linearly polarized light is left-circularly polarized through the upper retardation film 172. The left-circularly polarized light goes through the liquid crystal layer 200 disposed in the reflective region "B" without change of the polarized state. Next, the left-circularly polarized light is reflected at the reflective electrode 150 of FIG. 2, and so the left-circularly polarized light is right-circularly polarized. The right-circularly polarized light does not change through the liquid crystal layer 200 disposed in the reflective region "B". Next, the right-circularly polarized light is linearly polarized at an angle of 45 degrees through the upper retardation film 172, and the linearly polarized light has a direction perpendicular to the transmission axis of the upper polarizer 182. Accordingly, the linearly polarized light is not transmitted, and thus the displayed picture becomes black.

FIGS. 4A and 4B shows the polarized states before and after applying voltage in the transmissive mode, respectively. At this time, the liquid crystal layer 200 disposed in the transmissive region "A" of FIG. 2 has a phase difference of λ/2 before applying voltage.

In FIG. 4A, as voltage is not applied to the transflective LCD device, light incident from the back light 190 to the lower polarizer 181 of FIG. 2 is linearly polarized an angle of 45 degrees to the x-axis through the lower polarizer 181, and the linearly polarized light is right-circularly polarized through the lower retardation film 171. Next, the right-circularly polarized light goes through the transmissive electrode 130 and the right-circularly polarized light is left-circularly polarized through the liquid crystal layer 200 disposed in the transmissive region "A". The left-circularly polarized light is linearly polarized at an angle of 135 degrees through the upper retardation film 172. As the linearly polarized light has a polarizing direction to coincide with the transmission axis of the upper polarizer 182, the linearly polarized light is all transmitted. Therefore, the displayed picture becomes white.

On the other hand, in FIG. 4B, when voltage is applied to the transflective LCD device, light from the back light 190 is linearly polarized an angle of 45 degrees to the x-axis through the lower polarizer 181 of FIG. 2, and the linearly polarized light is right-circularly polarized through the lower retardation film 171. The right-circularly polarized light goes through the transmissive electrode and the liquid crystal layer 200 disposed in the transmissive region "A" without change of the polarized state. Next, the right-circularly polarized light is linearly polarized at an angle of 45 degrees through the upper retardation film 172, and the linearly polarized light has a direction to be perpendicular to the transmission axis of the upper polarizer 182. Accordingly, the linearly polarized light is not transmitted, and thus the displayed picture becomes black.

As stated above, different thickness between the transmissive region and the reflective region makes the displayed picture uniform and substantially dark in the black mode. Therefore, the contrast ratio of the transflective LCD device is increased and the quality of picture improves.

By the way, in the case of forming the transmissive hole 122 of FIG. 2, an inclined portion is formed between the transmissive region "A" and the reflective region "B", and the thickness of the liquid crystal layer 200 disposed in the inclined portion changes continuously. Accordingly, when the voltage is applied to the transflective LCD device, a fringe field is produced in the inclined portion and a distortion occurs. Also, the phase difference of the liquid crystal layer varies in the region, and thus light leakage occurs.

Figure 5:
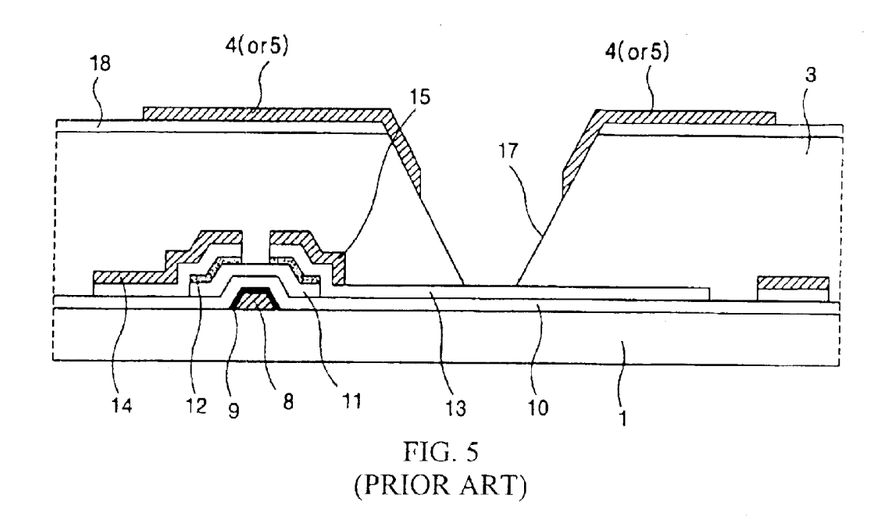
FIG. 5 is a drawing of a conventional transflective LCD according to Japanese published application No. 2000-275660.

The structure of the array panel for the transflective LCD device to prevent the leakage light like this is suggested in the Japanese publication No. 2000-275660. FIG. 5 is the representative drawing of 2000-275660.

As shown in FIG. 5, a thin film transistor, which includes a double-layered gate electrode 8 and 9, an active layer 11, ohmic contact layers 12, a source electrode 14 and a drain electrode 15, is formed on a substrate 1. A transparent electrode 13, which connects to the thin film transistor, is formed on the substrate 1. An interlayer 3 of a photosensitive resin is formed on the thin film transistor and the transparent electrode 13. The interlayer 13 has a transmissive hole exposing a part of the transparent electrode 13 and inclined portion 17. The inclined portion 17 is a border area between a transmissive region and a reflective region. A reflector 4 or 5 is formed on the interlayer 3, and the reflector 4 or 5 covers a part of the inclined portion 17. A concave-convex section 18 is formed between the interlayer 3 and the reflector 4 or 5 in order to increase reflection. In the array panel of 2000-275660, the effective area of the transmissive mode and the reflective mode has to be equal in order to get a stable picture. Here, the inclined portion 17 does not belong to the transmissive mode or the reflective mode. Therefore, the inclined portion is neither the transmissive region nor the reflective region. If one end of the reflector 4 or 5 is located on the inclined portion 17, the effective area of the transmissive region and the reflective region is not influenced even though there are a bit errors.

However, as stated above, the leakage light occurs in the inclined area 17. If the reflector 4 or 5 is formed covering all the inclined portion 17 in order to prevent the light leakage, the reflector 4 or 5 contacts the transparent electrode 13, and thus galvanic corrosion happens between the transparent electrode 13 and the reflector 4 or 5. Accordingly, the reflector 4 or 5 should not contact the transparent electrode 13 and must cover only a part of the inclined portion 17.

SUMMARY OF THE INVENTION

Accordingly, the present invention is directed to an array panel for a transflective liquid crystal display device that substantially obviates one or more of problems due to limitations and disadvantages of the related art.

An advantage of the present invention is to provide an array panel for a transflective liquid crystal display device in which a leakage light does not happen and has an increased contrast ratio.

Another advantage of the present invention is to provide an array panel for a transflective liquid crystal display device which has no afterimage.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an array panel for a transflective liquid crystal display device includes a substrate; a thin film transistor on the substrate; a first passivation layer covering the thin film transistor and having a first transmissive hole and an inclined portion surrounding the first transmissive hole; a transparent electrode on the first passivation layer, the transparent electrode contacting the thin film transistor; and a reflector over the transparent electrode, the reflector completely covering the inclined portion and having a second transmissive hole corresponding to the first transmissive hole. Here, the inclined portion slopes with an angle with respect to the substrate, and thereby light reflected at the reflector corresponding to the inclined portion substantially goes out of sight. The angle is within a range of about 20 to 110 degrees. And the angle is within a range of about 42 to 70 degrees, and thereby the light entirely goes out of sight. The first passivation layer includes one of a benzocyclobutene (BCB) and a photosensitive acrylic resin. The array panel further includes a second passivation layer disposed between the transparent electrode and the reflector, and the second passivation layer includes silicon nitride. The reflector is connected to the transparent electrode. The array panel further includes a gate line and a data line crossing each other and being electrically connected to the thin film transistor.

In another aspect, an array panel for a transflective liquid crystal display device includes a substrate; a thin film transistor on the substrate; a first passivation layer covering the thin film transistor, the first passivation layer having a first transmissive hole and an inclined portion surrounding the first transmissive hole; a reflector on the first passivation layer, the reflector completely covering the inclined portion and having a second transmissive hole corresponding to the first transmissive hole; and a transparent electrode over the reflector, the transparent electrode contacting the thin film transistor. The inclined portion slopes with an angle with respect to the substrate, and thereby a light reflected at the reflector corresponding to the inclined portion substantially going out of sight. The angle is within a range of about 20 to 110 degrees. And the angle is within a range of about 42 to 70 degrees, and thereby the light entirely going out of sight. The first passivation layer includes one of a benzocyclobutene (BCB) and a photosensitive acrylic resin. The array panel further includes a second passivation layer disposed between the transparent electrode and the reflector, and the second passivation layer includes silicon nitride. And the array panel further includes a gate line and a data line crossing each other and being electrically connected to the thin film transistor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiment of the present invention, which is illustrated in the accompanying drawings.

Figure 6:
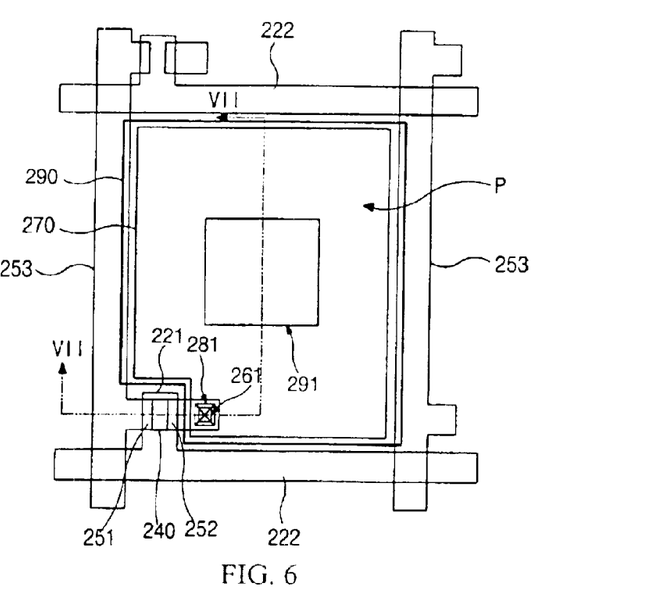
FIG. 6 is a plan view of showing an array panel according to a first embodiment of the present invention.
Figure 7:
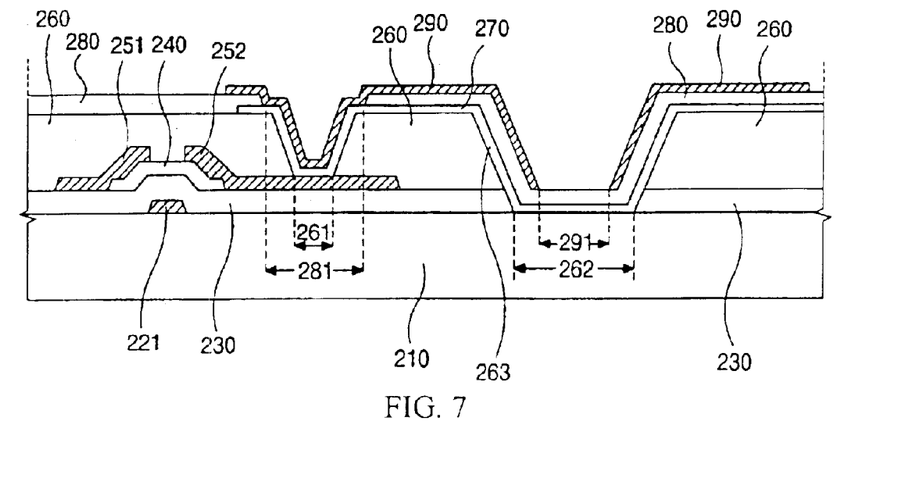
FIG. 7 is a cross-sectional view corresponding to the line VII—VII of FIG. 6.

FIG. 6 is a plan view of an array panel for a transflective liquid crystal display device according to a first embodiment of the present invention, and FIG. 7 is a cross-sectional view corresponding to the line VII—VII of FIG. 6.

In FIG. 6 and FIG. 7, a gate electrode 221 is formed on a substrate 210, and the gate electrode 221 is connected to a gate line 222 extending horizontally in the context of the figures. The substrate 210 is made of an insulating material such as glass, and the gate electrode 221 and the gate line 222 are formed of a conducting material such as a metal. A gate insulator 230 covers the gate electrode 221 and the gate line 222. The gate insulator 230 can be made of silicon nitride or silicon oxide. Next, an active layer 240 is formed on the gate insulator 230, and the active layer 240 is made of amorphous silicon. A source electrode 251 and a drain electrode 252 are formed on the active layer 240. The source electrode 251 is connected to a data line 253, which extends vertically in the context of the figure and crosses the gate line 222 to define a pixel region "P". Though not shown in the figures, ohmic contact layers are formed between the active layer 240 and the source and drain electrodes 251 and 252 to lower contact resistance between the active layer 240 and the two electrodes 251 and 252.

A first passivation layer 260 covers the source electrode 251, the drain electrode 252 and the data line 253. The first passivation layer 260 has a first contact hole 261, a first transmissive hole 262 and an inclined portion 263. The first contact hole 261 exposes a part of the drain electrode 252, and the first transmissive hole 262, exposes a part of the substrate 210 through the gate insulator 230. The first transmissive hole 262 can be formed in only the first passivation layer 260. The first passivation layer 260 is made of a benzocyclobutene (BCB) or a photosensitive acrylic resin. Next, a transparent electrode 270 is formed on the first passivation layer 260. The transparent electrode 270 is located in the pixel region "P" and is connected to the drain electrode 252 through the first contact hole 261. The transparent electrode 270 is made of a transparent conducting material such as an indium-tin-oxide (ITO).

A second passivation layer 280 is formed on the transparent electrode 270. The second passivation layer 280 has a second contact hole 281, which exposes a part of the transparent electrode 270. The second passivation layer 280 is made of a silicon nitride. A reflector 290 is formed on the second passivation layer 280. The reflector 290 is made of a metal, which reflects light well like aluminum (Al), and is connected to the transparent electrode 270 through the second contact hole 281. Then the reflector 290 acts as a reflective electrode. The reflector 290 has a second transmissive hole 291, which exposes the transparent electrode 270 placed in the first transmissive hole 262. At this time, the reflector 290 entirely covers the inclined portion 263.

If the reflector 290 contacts the transparent electrode 270 of ITO and is patterned by a wet etching method, galvanic erosion can occur at the contact area of the reflector 290 and the transparent electrode 270. Therefore, the second passivation layer 280 makes the contact area small, which prevents or limits the galvanic erosion. The second passivation layer 280 can be omitted if the reflector 290 is formed by a dry etching method.

Like this, the reflector covers the inclined portion located between the transmissive region and the reflective region in order to intercept the leakage light. At this time, the inclined portion should have a fixed angle.

Figure 8:
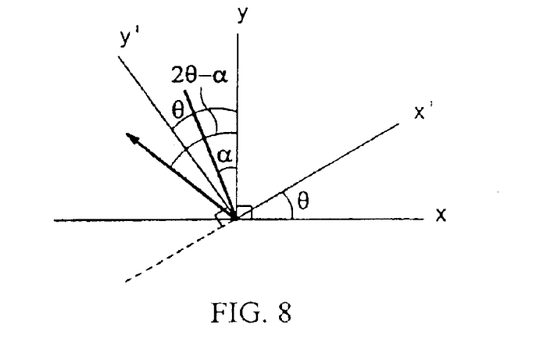
FIG. 8 is a drawing of calculating an inclined angle in the array panel of the present invention.

FIG. 8 is a drawing of calculating an inclined angle of the inclined portion in the array panel of the present invention.

As illustrated in FIG. 8, x-axis is defined in a direction parallel to the substrate 210 of FIG. 7 and y-axis is defined in a direction perpendicular to the x-axis. And also x'-axis is defined in a direction parallel to the incline plane of the inclined portion and y'-axis is defined in a direction perpendicular to the x'-axis. The x'-axis and the y'-axis have an angle of "θ" to the x-axis and the y-axis, respectively.

After light in the air passes through the upper substrate of the transflective LCD device, it is refracted at the liquid crystal layer and goes to the incline plane of the inclined portion. When the light incident upon the incline plane has an angle of "α" with respect to the y-axis, the incident light must be reflected toward the region between the y'-axis and the x-axis for the reflected light to go out of sight. Thus, the leakage light can be blocked. At this time, the reflected light makes an angle of "2θ-α" with the y-axis, and the "2θ-α" should be larger than the "α". Therefore, the "θ" is bigger than the "α".

Light incident from the outside to the transflective LCD device has an incidence angle of 0 to 90 degrees with respect to the longitudinal axis of the substrate. Here, the incident light having an incidence angle near 0 degree is emitted with an angle similar to the incidence angle. Accordingly, the incidence angle of the incident light is considered within a range of about 20 to 90 degrees.

If the refractive index of the air is "$n_1$", the average refractive index of the liquid crystal layer is "$n_2$" and the incidence angle of the incident light is "$\theta_1$", the transmission angle "$\theta_2$" of the transmitted light is calculated with the Snell's law ($n_1 \cdot \sin(\theta_1) = n_2 \cdot \sin(\theta_2)$). Here, the transmission angle "$\theta_2$" is the same as the angle "α". When the "$n_1$" is 1, the "$n_2$" is 1.5 and the incidence angle "$\theta_1$" is within a range of about 20 to 90 degrees, the transmission angle "$\theta_2$" becomes about 13 to 42 degrees. Therefore, the "$\alpha$" is within a range of about 20 to 90 degrees.

When a 12.1 inch panel, which is widely used for a notebook PC, is looked at from 30 centimeters away, the picture of the panel is seen without lowering of the contrast ratio at the maximum 30 degrees with respect to the longitudinal axis of the substrate. As the incidence angle "$\theta_1$" of the incident light is about 30 degrees, the transmission angle "$\theta_2$" of the transmitted light, i.e. the angle "$\alpha$", becomes about 20 degrees. It is possible that the incline plane is formed by an inclination angle of about 110 degrees and the inclination angle "$\theta$" should be bigger than the angle "$\alpha$", and thus the inclination angle "$\theta$" of the incline plane may be about 20 to 110 degrees.

On the other hand, as stated above, the maximum value of the "$\alpha$" is 42 degrees. Accordingly, if the angle "$\alpha$" is bigger than 42 degrees, the reflected light to all the incident light is made to go out of sight. Consequently, the inclination angle "$\theta$" should desirably be within an angle of about 42 to 70 degrees.

The inclination angle "$\theta$" can be controlled according to the process condition of forming the first passivation layer 260 of FIG. 7. For example, in case of forming the first passivation layer of the BCB, which is patterned in a dry etching method using an etching gas, the inclination angle "$\theta$" is controlled by changing the dry etching condition. Generally, the gas for etching the BCB includes sulfur hexafluoride ($SF_6$) or oxygen ($O_2$). At this time, if the composition rate of the $O_2$ in the etching gas is large, the etched BCB has a small inclination angle, and if the composition rate of the $O_2$ in the etching gas is small, the etched BCB has a large inclination angle. This is the reason a photoresist layer, which is used in etch of the BCB, is removed quickly in proportion to a quantity of $O_2$. Besides, the gradient of the etched BCB is gentle if the pressure of the etching gas is low, and the gradient of the etched BCB is steep if the pressure of the etching gas is high.

Meanwhile, if a photosensitive resin such as acrylic resin is used as the first passivation layer, the physical properties of the photosensitive resin can be changed or the light intensity of exposing the border region can be controlled to change the inclination angle. Here, quick change in the exposing light intensity results in a gentle incline plane, and slow change in the exposing light intensity results in a steep incline plane.

In the present invention, if the inclination angle of the inclined portion is over 20 degrees, and then the leakage light can be intercepted. Therefore, the contrast ratio of the transflective LCD device increases.

In the first embodiment of the present invention, the reflector is formed over the transparent electrode, but the reflector can be formed under the transparent electrode. This second embodiment of the present invention is described in the following.

Figure 9:
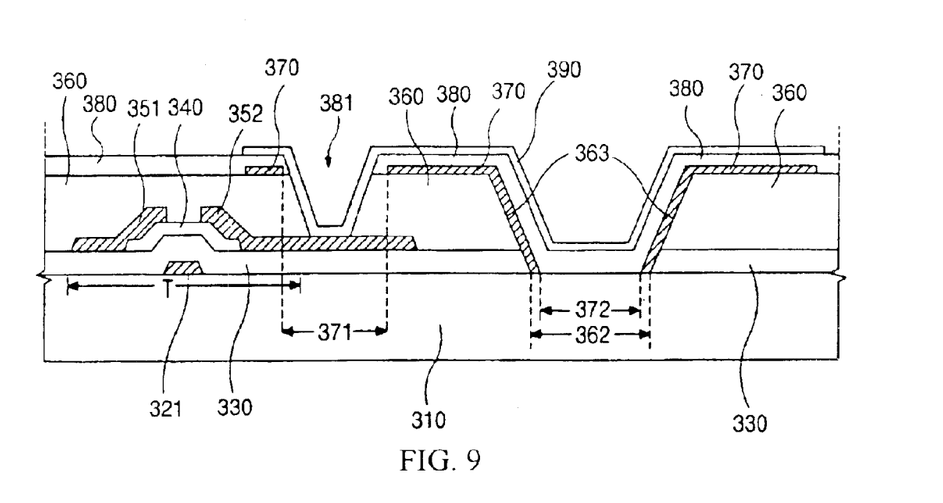
FIG. 9 is a cross-sectional view of the array panel according to a second embodiment of the present invention.

FIG. 9 is a cross-sectional view of the array panel according to the second embodiment of the present invention. A plan view of the second embodiment is similar to FIG. 6.

In FIG. 9, a thin film transistor "T" is formed on a substrate 310 and the thin film transistor "T" includes a gate electrode 321, a source electrode 351 and a drain electrode 352. The gate electrode 321 is formed on the substrate 310 and a gate insulator 330 covers the gate electrode 321. And an active layer 340 as a channel of the thin film transistor "T" is formed on the gate insulator 330. Next, the source electrode 351 and the drain electrode 352 are formed on the active layer 340. Though not shown in the figures, ohmic contact layers are formed between the active layer 340 and the source and drain electrodes 351 and 352.

A first passivation layer 360 covers the source electrode 351 and the drain electrode 352. The first passivation layer 360 has a first transmissive hole 362 and an inclined portion 363. The first transmissive hole 362 exposes a part of the substrate 310 through the gate insulator 330. The first passivation layer 360 is made of a benzocyclobutene (BCB) or a photosensitive acrylic resin. Here, an inclination angle of the inclined portion 363 is over 20 degrees, and it is desirable that the inclination angle of the inclined portion 363 is within a range of about 42 to 70 degrees.

Next, a reflector 370 is formed on the first passivation layer 360. The reflector 370 has an open portion 371 over the drain electrode 352 and a second transmissive hole 372 corresponding to the first transmissive hole 362. The reflector 370 is made of a metal, which reflects light well like aluminum (Al). At this time, the reflector 370 entirely covers the inclined portion 363.

A second passivation layer 380 is formed on the reflector 370 and covers the reflector 370. The second passivation layer 380 has a contact hole 381, which exposes a part of the drain electrode 352, through the first passivation layer 360 through the open portion 371. The second passivation layer 380 is made of a silicon nitride. The second passivation layer 380 over the transmissive holes 362 and 372 can be etched.

Next, a transparent electrode 390 is formed on the second passivation layer 380 and the transparent electrode 390 is connected to the drain electrode 352 through the contact hole 361. The transparent electrode 370 is made of a transparent conducting material such as an indium-tin-oxide (ITO).

In the second embodiment of the present invention, the transparent electrode, which is made of the same material as a common electrode of the upper substrate, is formed on the top of the lower substrate, and then an afterimage can be cut off.

Figure 10:
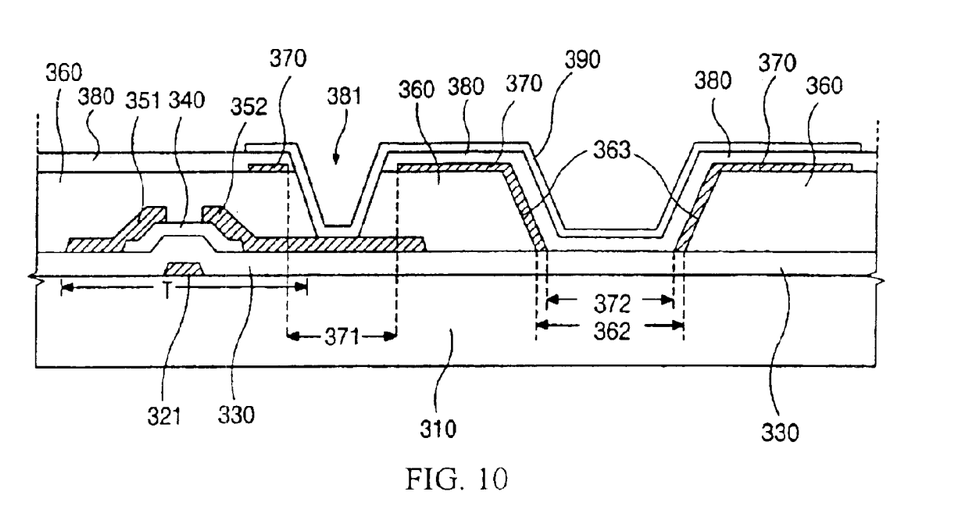
FIG. 10 is a cross-sectional view of the array panel according to a third embodiment of the present invention.

FIG. 10 is a cross-sectional view of the array panel according to a third embodiment of the present invention. A plan view of the third embodiment is similar to FIG. 6. The third embodiment is similar to the second embodiment, except that the first transmissive hole 362 and the second transmissive hole 372 corresponding to the first transmissive hole 362 do not extend through the gate insulation layer 330.

In FIG. 10, a thin film transistor "T" is formed on a substrate 310 and the thin film transistor "T" includes a gate electrode 321, a source electrode 351 and a drain electrode 352. The gate electrode 321 is formed on the substrate 310 and a gate insulator 330 covers the gate electrode 321. And an active layer 340 as a channel of the thin film transistor "T" is formed on the gate insulator 330. Next, the source electrode 351 and the drain electrode 352 are formed on the active layer 340. Though not shown in the figures, ohmic contact layers are formed between the active layer 340 and the source and drain electrodes 351 and 352.

A first passivation layer 360 covers the source electrode 351 and the drain electrode 352. The first passivation layer 360 has a first transmissive hole 362 and an inclined portion 363. The first transmissive hole 362 exposes a part of the gate insulator 330. The first passivation layer 360 is made of a benzocyclobutene (BCB) or a photosensitive acrylic resin. Here, an inclination angle of the inclined portion 363 is over 20 degrees, and it is desirable that the inclination angle of the inclined portion 363 is within a range of about 42 to 70 degrees.

Next, a reflector 370 is formed on the first passivation layer 360. The reflector 370 has an open portion 371 over the drain electrode 352 and a second transmissive hole 372 corresponding to the first transmissive hole 362. Like the first transmissive hole 362, the second transmissive hole 372 does not extend through the gate insulator 330. The reflector 370 is made of a metal, which reflects light well like aluminum (Al). At this time, the reflector 370 entirely covers the inclined portion 363.

A second passivation layer 380 is formed on the reflector 370 and covers the reflector 370. The second passivation layer 380 has a contact hole 381, which exposes a part of the drain electrode 352, with the first passivation layer 360 through the open portion 371. The second passivation layer 380 is made of a silicon nitride. The second passivation layer 380 over the transmissive holes 362 and 372 can be etched.

Next, a transparent electrode 390 is formed on the second passivation layer 380 and the transparent electrode 390 is connected to the drain electrode 352 through the contact hole 361. The transparent electrode 370 is made of a transparent conducting material such as an indium-tin-oxide (ITO) or Indium Zinc Oxide (IZO).

In the third embodiment of the present invention, the transparent electrode, which is made of the same material as a common electrode of the upper substrate, is formed on the top of the lower substrate, and then an afterimage can be cut off.

It will be apparent to those skilled in the art that various modifications and variation can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. An array panel for a transflective liquid crystal display device, comprising:
   a substrate;
   a thin film transistor on the substrate;
   a first passivation layer covering the thin film transistor, the first passivation layer having a first transmissive hole and an inclined portion surrounding the first transmissive hole;
   a reflector on the first passivation layer, the reflector completely covering the inclined portion and having a second transmissive hole corresponding to the first transmissive hole; and
   a transparent electrode over the reflector, the transparent electrode contacting the thin film transistor.

2. The array panel according to claim 1, wherein the inclined portion slopes with an incline angle with respect to the substrate, such that light reflected at the reflector corresponding to the inclined portion is substantially reflected out of a viewing range.

3. The array panel according to claim 2, wherein the incline angle is within a range of about 20 to 110 degrees.

4. The array panel according to claim 3, wherein the incline angle is within a range of about 42 to 70 degrees.

5. The array panel according to claim 1, wherein the first passivation layer includes one of a benzocyclobutene (BCB) and a photosensitive acrylic resin.

6. The array panel according to claim 1, further comprising a second passivation layer disposed between the transparent electrode and the reflector.

7. The array panel according to claim 6, wherein the second passivation layer is transparent.

8. The array panel according to claim 6, wherein the second passivation layer includes silicon nitride.

9. The array panel according to claim 1, further comprising a gate line and a data line, the gate line and the data line crossing each other and being electrically connected to the thin film transistor.

10. The array panel according to claim 1, further comprising a gate insulator between the substrate and the first passivation layer.

* * * * *